July 30, 1963

D. H. WALLACE ETAL 3,099,567

COMBINATION FOOD PACKAGE, SHIPPING, DISPLAY AND HEAT
EXCHANGE CONTAINER AND SERVING TRAY

Filed June 3, 1959

INVENTORS
DAVID H. WALLACE
WILLIAM E. VALLIANT
F. PHILLIPS WILLIAMSON
OTTO JOHN MUNZ

BY *Otto John Munz*

ATTORNEY

United States Patent Office 3,099,567
Patented July 30, 1963

3,099,567
COMBINATION FOOD PACKAGE, SHIPPING, DISPLAY AND HEAT EXCHANGE CONTAINER AND SERVING TRAY
David H. Wallace, Annapolis, William E. Valliant and Fletcher Phillips Williamson, Cambridge, and Otto John Munz, Annapolis, Md.; said Wallace, Valliant, and Williamson, assignors to said Munz
Filed June 3, 1959, Ser. No. 817,837
6 Claims. (Cl. 99—171)

This invention relates to a compartmentalized serving tray food package display container and shipping container combination for foods such as bivalves and other foods whereby shucked oysters and related mollusks and other fooods may be stored, frozen, displayed, transported and served therein and eaten therefrom.

It is the general object of this invention to provide an improved container for foods such as bivalves whereby each bivalve, with or without its natural juices, can be separately stored, individually, and sealed in an attractive tray which doubles as shipping container, a food display container, a ready-to-serve food package, a heat exchange medium, a food serving tray from which the succulent mollusks may be eaten upon opening the seals.

It is a further object of this invention to provide an improved container for bivalves having a compartment for the appropriate condiment in the form of a pressure pot located within the periphery of each compartment whereby the condiment can be released over the bivalve just prior to eating by application of pressure.

It is yet another object of this invention to provide a container of the type described having a compartment adjacent the cavities wherein a suitable refrigerant can be stored to insure proper freezing of the bivalves.

It is another object of this invention to provide a container of the type described which can be easily stacked one within the other and which is durable enough to withstand the rigors of freezing and transporting.

It is still another object of this invention to provide a container of the type described which is inexpensive enough to be disposable upon one using and yet capable of re-use if desired.

Other objects, advantages and results of the invention will be brought out by the following description in conjunction with the accompanying drawings in which—

Figure 1:
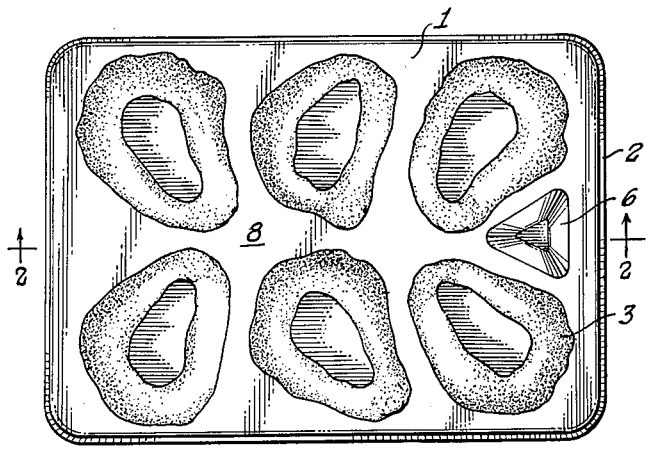
FIG. 1 is a top plan view of the tray container.
Figure 2:
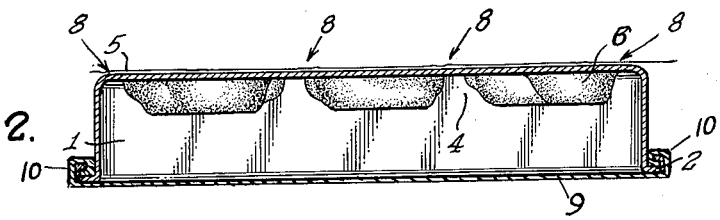
FIG. 2 is a section taken on the line 2—2 of FIG. 1, with a bottom cover added to the tray container.

Looking now with more particularity at FIGS. 1 and 2, it is seen that the instant invention comprises a tray 1 containing a plurality of depressions of concavities 3. These concavities 3 are preferably shaped to form the natural contours of a half shell of the food being stored. As shown in the embodiment the concavities are in the shape of oyster half shells. The tray 1 has vertical walls 4 ending in a peripheral flange 2. When the trays are not in use, their configurations lend themselves to economical stacking by nesting one in the other. A cavity 6 is included in the tray for use as a storage for the desired sauce or condiment with which the bivale is eaten. A transparent sheet 5 of appropriate material serves to cover the top of tray 1, sealing each bivalve in its cavity as will be hereinafter described in greater detail. The bottom of the tray 1 preferably is sealed tight by a bottom cover 9 having a flange 10 which interfits peripheral flange 2.

Figure 3:
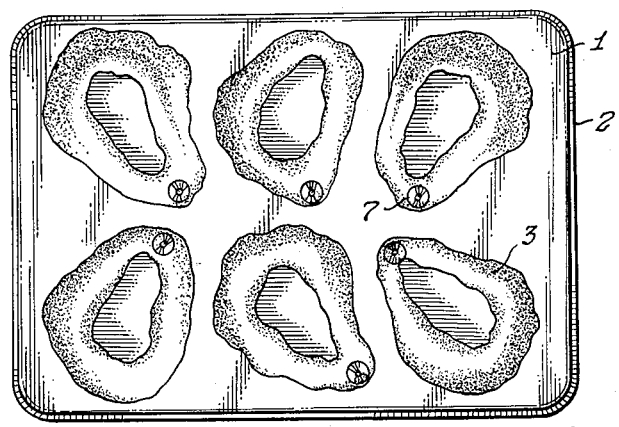
FIG. 3 is a top plan view of the invention showing an added feature.

FIG. 3 discloses a refinement in the storage of the sauce or condiment. A small separate-walled cavity 7 is contained in each of the larger cavities 3. This permits placing the exact amount of sauce desired for each bivalve right with said bivalve. It also allows the gourmet to select a variety of sauces for each trayful of bivalves.

The trays 1 are packed as follows: the tray is placed upside down and the cavity defined by the vertical walls 4 and the top of the tray is filled with water, ice or other refrigerant or heating medium. Bottom cover 9 is then pressed into place, flange 10 fitting over and locking with peripheral flange 2, providing a water-tight seal. The tray 1 is then turned right side up and the cavities 3 are each filled with the food such as a shucked oyster or the like, with or without the bivalve's natural juices, as desired. Sheet 5 is then placed over the top of tray 1. Optionally, this may be done under vacuum. Sheet 5 is preferably transparent, thin and made of a suitable thermoplastic material compatible to coalescing with the tray 1 and forming a hermetical seal upon application of heat and pressure by means of a hot bar or the like or by pressure alone. Suitable thermoplastic materials are polyethylene, polyvinyl chloride, methyl methacrylate, polystyrene, and similar plastics which are non-toxic and do not impart offensive flavors or odors to the food. The tray 1 is preferably made of a heavier gauge thermoplastic material as is bottom cover 9. Tray 1 with the cavities 3 and 6 (and cavities 7 where appropriate) along with peripheral flange 2 is made in one integral piece. Suitable dies are used to form the cavities and the entire unit is molded of a piece under heat and pressure in a manner well known in the art. When heat sealing sheet 5 to the top of tray 1, each cavity is preferably sealed around its entire periphery to avoid leakage in storage or transport. As shown in FIGS. 1 and 2, areas 8 are suggested sealing paths. The entire unit can be quickly frozen before or after sealing and stored or transported, remaining in the frozen state until it reaches its ultimate consumer. The freezing of the tray prior to its sealing may be selected to avoid heating of the food during heat sealing.

It is not intended that the instant invention should be restricted to any particular method of sealing the bivalves in place. For example, it is within the scope of this invention to replace thermoplastic sheet-cover and bottom 8 with a plastic shrinkable bag made of a heat shrinkable film fabricated from any of a number of numerous polymers, enveloping the entire tray loosely and tight-sealed. Shrinkable plastic bags are available commercially for packaging foodstuffs which can shrink 40 percent or more in every direction. An example of the polymers capable of such performance are vinylidene chloride-vinyl chloride copolymers or blends of vinylidine chloride. While these two types of film fabricated into bags are available commercially, it is possible to fabricate heat shrinkable films from many polymers. The bag is heat-sealed using a hot bar. Heat is then applied in a manner well known in the art whereby the bag shrinks tightly over the entire unit, sealing in the cavities and the bottom cover. As an added precaution, a hot bar can be run over the ribs of the top of tray 1 between each cavity to insure hermetical sealing.

It should also be understood that bottom cover 9 may be dispensed with entirely. In such a case, after the bivalves are heat-sealed or otherwise secured in their cavities, the tray can be quick frozen, with or without refrigerant, until ready for use.

Any of the above embodiments of the invention permit re-use of tray 1; however, the method of manufacture and the material used are such that the trays can be economically disposed of after one using.

When the bivalves are to be refrigerated but not frozen, the instant invention is particularly useful. Under such circumstances, the bivalves are heat-sealed in place and can be safely transported without danger of leakage.

While we have herein described and in the drawings shown illustrative embodiments of the invention, it is to be understood that the invention is not limited thereto but is meant to include other constructions, arrangements of parts, details and features without departing from the spirit of the invention.

We claim:

1. A container for serving food, comprising a body of sheet material having a planar top and a skirt extending about and depending from the periphery of said top, there being a plurality of concavities in said planar top, each separated from the others by a planar portion of said top, each concavity forming a compartment to hold food, said skirt terminating in a plane to form a support for said container and to provide a space for receiving a heat exchange medium for transfering heat between said food and said heat-exchange medium.

2. A heat exchange package comprising a container body of sheet material having a planar top and a skirt extending about and depending from the periphery of said top, there being a plurality of concavities in said planar top, each separated from the others by a planar portion of said top, each concavity forming a compartment to hold food, said skirt terminating in a plane to form a support for said container and to provide a space for receiving a heat exchange medium for transferring heat between said food and said heat exchange medium, the heat exchange medium disposed in said space, and bottom cover means secured to said skirt sealing said heat exchange medium in said space.

3. A food package comprising a container of sheet material having a planar top and a skirt extending about and depending from the periphery of said top, there being a plurality of concavities in said planar top, each separated from the others by a planar portion of said top, each concavity forming a compartment to hold food, said skirt terminating in a plane to form a support for said container and to provide a space for receiving a heat exchange medium for transfering heat between said food and said heat exchange medium, food in said concavities and top cover means attached to said container sealing the food airtight therein.

4. A container as claimed in claim 1, said container with food enclosed within at least one said concavity sealed in, forming an integral unit.

5. A heat exchange package as claimed in claim 2, said container with said heat exchange medium enclosed therein sealed in, to form an integral unit.

6. A combination tray for serving food, a heat exchange package for retaining a temperature of the contents imparted thereto, a food package and a display container as an integral unit, comprising a container having a planar top with at least one concavity therein, food packed in said at least one concavity, a skirt extending about and depending from the periphery of said top and terminating in a plane to form a support for said container and a bottom space for receiving a heat exchange medium for transferring heat between said food and said heat exchange medium, heat exchange medium within said bottom space, and covers for the at least one concavity and said bottom space respectively, said container with said food, said heat exchange medium and said covers forming a unit.

References Cited in the file of this patent

UNITED STATES PATENTS

| | | |
|---|---|---|
| 1,881,873 | Newcomb | Oct. 11, 1932 |
| 2,048,041 | Warren et al. | July 21, 1936 |
| 2,674,536 | Fisher | Apr. 6, 1954 |
| 2,678,543 | Lapetina | May 18, 1954 |
| 2,749,245 | Peters | June 5, 1956 |
| 2,801,930 | Paulucci | Aug. 6, 1957 |
| 2,843,496 | Altenburg et al. | July 15, 1958 |
| 2,844,268 | Lambert | July 22, 1958 |
| 2,850,391 | Gunsberg | Sept. 2, 1958 |
| 2,878,128 | Jorgenson | Mar. 17, 1959 |
| 2,891,870 | Selby et al. | June 23, 1959 |
| 2,918,379 | Lurie | Dec. 22, 1959 |
| 2,935,206 | Smith | May 3, 1960 |